United States Patent
Sugawara

(10) Patent No.: US 9,550,425 B2
(45) Date of Patent: Jan. 24, 2017

(54) ELECTRIC STORAGE DEVICE FOR VEHICLE DEPLOYMENT

(75) Inventor: Tatsuo Sugawara, Hitachinaka (JP)

(73) Assignee: Hitachi Automotive Systems, Ltd., Ibaraki (JP)

(*) Notice: Subject to any disclaimer, the term of this patent is extended or adjusted under 35 U.S.C. 154(b) by 210 days.

(21) Appl. No.: 14/407,333

(22) PCT Filed: Jun. 13, 2012

(86) PCT No.: PCT/JP2012/065137
§ 371 (c)(1),
(2), (4) Date: Apr. 23, 2015

(87) PCT Pub. No.: WO2013/186878
PCT Pub. Date: Dec. 19, 2013

(65) Prior Publication Data
US 2015/0291045 A1    Oct. 15, 2015

(51) Int. Cl.
*H02P 1/00* (2006.01)
*H02J 7/00* (2006.01)
(Continued)

(52) U.S. Cl.
CPC ......... *B60L 11/1811* (2013.01); *B60L 11/1803* (2013.01); *B60L 11/1861* (2013.01);
(Continued)

(58) Field of Classification Search
CPC .............. B60L 11/1811; B60L 11/1803; B60L 11/1861; B60L 11/1864; B60L 3/0046;
H01M 2/1077; H01M 10/425; H01M 2/48; H01M 2/482; H01M 2010/4271; H01M 2220/20; H02J 7/1423; Y02T 10/7005
(Continued)

(56) References Cited

U.S. PATENT DOCUMENTS

2002/0187390 A1    12/2002  Kimoto et al.
2010/0075206 A1    3/2010   Tamura
(Continued)

FOREIGN PATENT DOCUMENTS

JP    2000-223160 A    8/2000
JP    2002-367684 A    12/2002
(Continued)

*Primary Examiner* — Bentsu Ro
*Assistant Examiner* — Zemenay Truneh
(74) *Attorney, Agent, or Firm* — Volpe and Koenig, P.C.

(57) ABSTRACT

An upper chamber and a lower chamber are provided in a housing of an electric storage device for vehicle deployment by a middle base plate. The lower chamber is sealed with respect to the upper chamber by the middle base plate. A battery module is disposed in the lower chamber. A control device, such as a cell controller, and electrical parts, such as a junction box and a service disconnect switch, are mounted in the upper chamber. Strong and weak current system wiring that connect the battery module and the electrical parts respectively penetrate strong and weak current system openings of the middle base plate, and are routed to the upper chamber. The openings, which are penetrated by the strong and the weak current system wiring, are each provided with a sealing member, and thus the lower chamber is sealed with respect to the upper chamber.

7 Claims, 14 Drawing Sheets

(51) Int. Cl.
    *B60L 11/18*     (2006.01)
    *H01M 2/10*     (2006.01)
    *H01M 10/42*     (2006.01)
    *H02J 7/14*     (2006.01)
    *H01M 10/48*     (2006.01)
    *B60L 3/00*     (2006.01)

(52) U.S. Cl.
    CPC ....... *B60L 11/1864* (2013.01); *H01M 2/1077* (2013.01); *H01M 10/425* (2013.01); *H01M 10/48* (2013.01); *H01M 10/482* (2013.01); *H02J 7/1423* (2013.01); *B60L 3/0046* (2013.01); *H01M 2010/4271* (2013.01); *H01M 2220/20* (2013.01); *Y02T 10/7005* (2013.01)

(58) Field of Classification Search
    USPC .......................................... 318/139; 320/118
    See application file for complete search history.

(56) References Cited

U.S. PATENT DOCUMENTS

2010/0248008 A1   9/2010  Sugawara et al.
2012/0025769 A1*  2/2012  Kikuchi ................ B60L 3/0046
                                                                320/118

FOREIGN PATENT DOCUMENTS

| | | |
|---|---|---|
| JP | 2003-243049 A | 8/2003 |
| JP | 2007-311172 A | 11/2007 |
| JP | 2009-123371 A | 6/2009 |
| JP | 2010-080134 A | 4/2010 |
| JP | 2010-238609 A | 10/2010 |
| JP | 2012-074350 A | 4/2012 |
| JP | 2013-129391 A | 7/2013 |
| WO | 2012/140727 A1 | 10/2012 |

\* cited by examiner (a)

(b)

ELECTRIC STORAGE DEVICE FOR VEHICLE DEPLOYMENT

TECHNICAL FIELD

The present invention relates to an electric storage device for vehicle deployment.

BACKGROUND ART

Due to increased consciousness to fuel economy and environmental issues in recent years, attentions have been paid on hybrid vehicles and electric vehicles. A battery is mounted in a hybrid vehicle or an electric vehicle, and a vehicle is driven by obtaining power from the battery.

For example, in an electric storage device for vehicle deployment described in PTL 1, plural battery blocks, each of which includes plural cell batteries, are connected by a bus bar to form a battery module, and the battery module is housed in a battery case. The battery case also incorporates a protective electronic circuit for the cell batteries.

CITATION LIST

Patent Literature

PTL 1: JP-A-2000-223160

SUMMARY OF INVENTION

Technical Problem

The battery is installed in any of various positions within the vehicle. Meanwhile, since the battery is arranged in a limited space, dimensional limitation is imposed thereon. Thus, downsizing of the battery is requested.

Solution to Problem

An electric storage device for vehicle deployment according to the invention includes on or more of the following (a) to (i):
(a) the electric storage device for vehicle deployment which performs discharge of electric power to an inverter device which controls a motor, and charge of electric power supplied from the inverter device, in the electric storage device,
(b) a housing that has a lower housing, an upper housing, and a middle base plate mounted between the lower housing and the upper housing, in which the lower chamber is formed below the middle base plate, in which the upper chamber is formed above the middle base plate, and in which the lower chamber is formed in an airtight state with respect to the upper chamber,
(c) at least two battery blocks that are arranged in the lower chamber and each of which includes plural cell batteries housed in a cell housing,
(d) a control device that is arranged in the upper chamber and monitors and controls states of the plural cell batteries,
(e) a junction box that has: a positive electrode external terminal that is connected to positive electrode power supply wiring for connecting a positive electrode terminal of the battery block of the highest potential of the battery blocks to a positive electrode DC terminal of the inverter device; and a negative electrode external terminal that is connected to a negative electrode external power supply wiring for connecting a negative electrode terminal of the battery block of the lowest potential of the battery blocks to a negative electrode DC terminal of the inverter device,
(f) positive electrode internal power supply wiring and negative electrode internal power supply wiring, the positive electrode internal power supply wiring penetrating a strong current system opening provided in the middle base plate, being routed from the lower chamber to the upper chamber, and connecting the positive electrode terminal of the battery block of the highest potential to the positive electrode external terminal of the junction box, and the negative electrode internal power supply wiring connecting the negative electrode terminal of the battery block of the lowest potential to the negative electrode external terminal of the junction box within the housing,
(g) voltage signal wiring that is connected to the positive and negative electrode terminals of the plural cell batteries, penetrates a weak current system opening of the middle base plate, is routed from the lower chamber to the upper chamber, and is connected to the control device within the housing,
(h) a first sealing member that seals the strong current system opening provided in the middle base plate and tightly closes the lower chamber from the upper chamber, and
(i) a second sealing member that seals the weak current system opening provided in the middle base plate and tightly closes the lower chamber from the upper chamber.

Advantageous Effects of Invention

According to the invention, the battery blocks are mounted in the lower chamber, which is tightly closed by the middle base plate, and the control device is mounted in the upper chamber on the middle base plate. The wiring for electrically connecting the battery blocks and the control device penetrates the openings provided in the middle base plate, and the openings are sealed by the sealing members. Accordingly, a electric storage device can be provided that is downsized and that has no possibility of mist being spouted from the battery cell to contact the control device.

BRIEF DESCRIPTION OF DRAWINGS

FIG. 7 is a perspective view for explaining an attachment position of a temperature sensor that is provided in the battery block, wherein FIG. 7(a) is a view that is seen from an upper surface side, and FIG. 7(b) is a view that is seen from a lower surface side.

DESCRIPTION OF EMBODIMENTS

This embodiment is an example in which the invention is applied to a electric storage device for constituting a power supply device for vehicle deployment of an electrically powered vehicle, particularly, an electric vehicle. The electric vehicles include: a hybrid electric vehicle that includes an engine as an internal combustion engine and a motor as a drive source of the vehicle, a pure electric vehicle that includes a motor as an only drive source of the vehicle, and the like.

A detailed description will hereinafter be made on a configuration of an electric machine system for vehicle deployment (a motor drive system) that includes an electric storage device of the embodiment with reference to the drawings.

—Electric Machine System for Vehicle Deployment—

Figure 1:
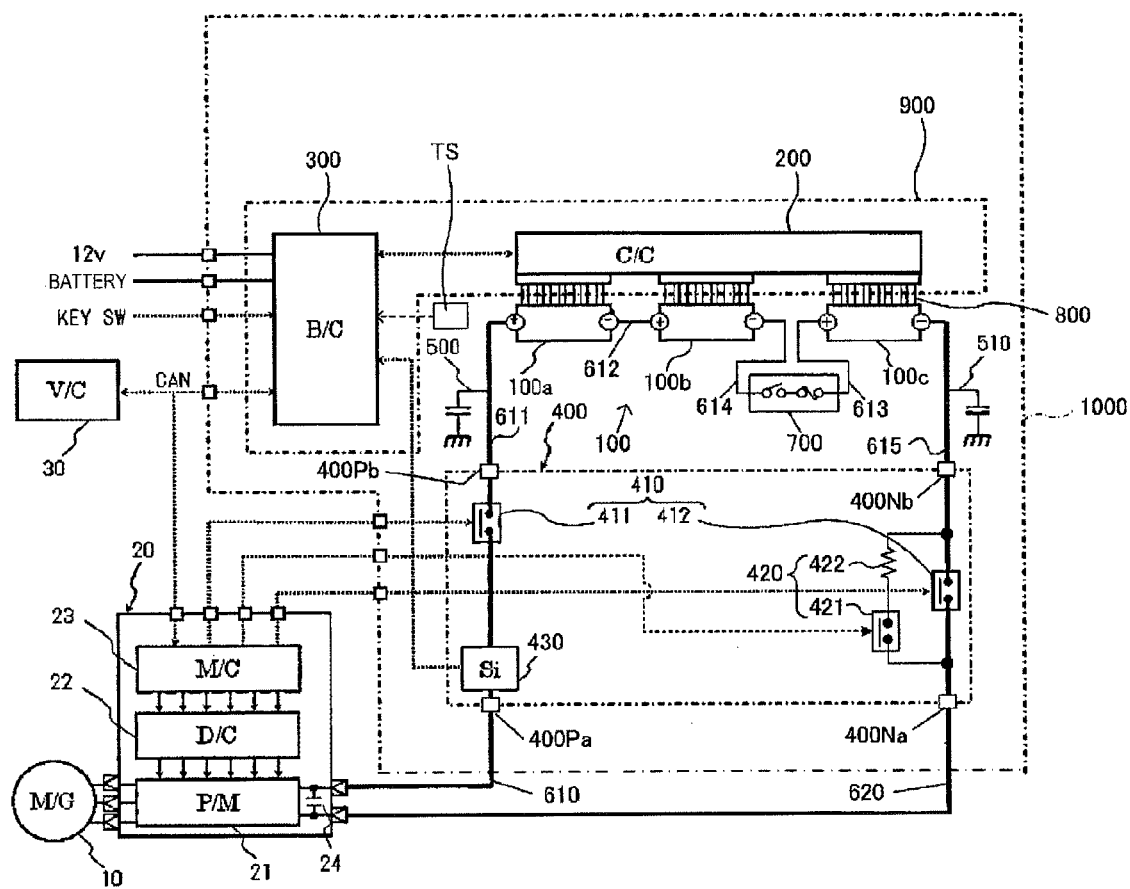
FIG. 1 is a block diagram of a configuration of an electric machine system for vehicle deployment, in which an embodiment of a electric storage device according to the invention is used.

FIG. 1 shows an overall configuration of the electric machine system for vehicle deployment. The electric machine system for vehicle deployment includes a motor generator 10, an inverter device 20, a vehicle controller 30 for controlling the entire vehicle, an electric storage device 1000 for constituting a power supply device for vehicle deployment, and the like. The electric storage device 1000 includes plural storage batteries and is configured as a lithium-ion battery device that includes plural lithium-ion cell batteries, for example.

(Motor Generator 10)

The motor generator 10 is a three-phase alternate-current (AC) synchronous machine. In an operation mode that requires rotary power, such as during power running of the vehicle and during the engine start, the motor generator 10 drives the motor and supplies the generated rotary power to driven bodies, such as wheels and the engine. In this case, the electric machine system for vehicle deployment converts DC power from the lithium-ion battery device 1000 to three-phase AC power through the inverter device 20 that is a power converter, and supplies the three-phase AC power to the motor generator 10.

In an operation mode that requires power generation, such as during regeneration including deceleration, braking, and the like of the vehicle and such as when the lithium-ion battery device 1000 needs to be charged, the motor generator 10 is driven by drive power from the wheels or the engine and, as a generator, generates the three-phase AC power. In this case, the electric machine system for vehicle deployment converts the three-phase AC power from the motor generator 10 to the DC power through the inverter device 20, and supplies the DC power to the lithium-ion battery device 1000. In this way, power is accumulated in the lithium-ion battery device 1000.

(Inverter Device 20)

The inverter device 20 is an electronic circuit device that controls the above-described power conversion, that is, the conversion from the DC power to the three-phase AC power and the conversion from the three-phase AC power to the DC power, by actuation (ON/OFF) of a switching semiconductor element. The inverter device 20 includes a power module 21, a driver circuit 22, a motor controller 23, and a smoothing capacitor 24.

The power module 21 is a power conversion circuit that includes the six switching semiconductor elements and performs the above-described power conversion by a switching operation (ON/OFF) of each of these six switching semiconductor elements.

As the switching semiconductor element, for example, a metal-oxide semiconductor field-effect transistor (MOSFET) or an insulated gate bipolar transistor (IGBT) is used. When the power module 21 is formed of the MOSFET, a parasitic diode is electrically connected in reverse parallel between a drain electrode and a source electrode. Meanwhile, when the power module 21 is formed of the IGBT, the diode needs to be additionally and electrically connected in reverse parallel between a collector electrode and an emitter electrode.

The power module 21 is formed of a three-phase bridge circuit in which series circuits for three phases are electrically connected in parallel. In each series circuit (an arm for one phase), the two switching semiconductor elements (of an upper arm and a lower arm) are electrically connected in series.

The power module 21 is provided with a DC positive electrode side module terminal (not shown) and a DC negative electrode side module terminal (not shown). An opposite side from a connection side to the lower arm in each upper arm is electrically connected to the DC positive electrode side module terminal. An opposite side from a connection side to the upper arm in each lower arm is electrically connected to the DC negative electrode side module terminal. The DC positive electrode side module terminal and the DC negative electrode side module terminal are respectively electrically connected to a DC positive electrode side external terminal and a DC negative electrode side external terminal. The DC positive electrode side external terminal and the DC negative electrode side external terminal are power supply side terminals for supplying and receiving the DC power to/from the lithium-ion battery device 1000. A positive electrode side power supply cable 610 and a negative electrode side power supply cable 620, both of which extend from the lithium-ion battery device 1000, are respectively electrically connected to the DC positive electrode side external terminal and the DC negative electrode side external terminal.

Furthermore, an AC side module terminal is provided in the power module 21. The AC side module terminal is electrically connected to an AC side external terminal. The AC side external terminal is a load side terminal for supplying and receiving the three-phase AC power to/from the motor generator 10. A load cable that extends from the motor generator 10 is electrically connected to the AC side external terminal.

The motor controller 23 is an electronic circuit device for controlling the switching operations of the six switching semiconductor elements, which constitute the power module 21. Based on a torque command that is output from a host control device, for example, the vehicle controller 30 for controlling the entire vehicle, the motor controller 23 generates a switching operation command signal (for example, a pulse width modulation signal (PWM)) for the six switching semiconductor elements. This generated command signal is output to the driver circuit 22.

Based on the switching operation command signal that is output from the motor controller 23, the driver circuit 22 generates a drive signal for the six switching semiconductor elements, which constitute the power module 21. This drive signal is output to a gate electrode of each of the six switching semiconductor elements, which constitute the power module 21. In this way, based on the drive signal that is output from the driver circuit 22, switching (ON/OFF) of the six switching semiconductor elements, which constitute the power module 21, is controlled.

(Electric Storage Device 1000)

Figure 2:
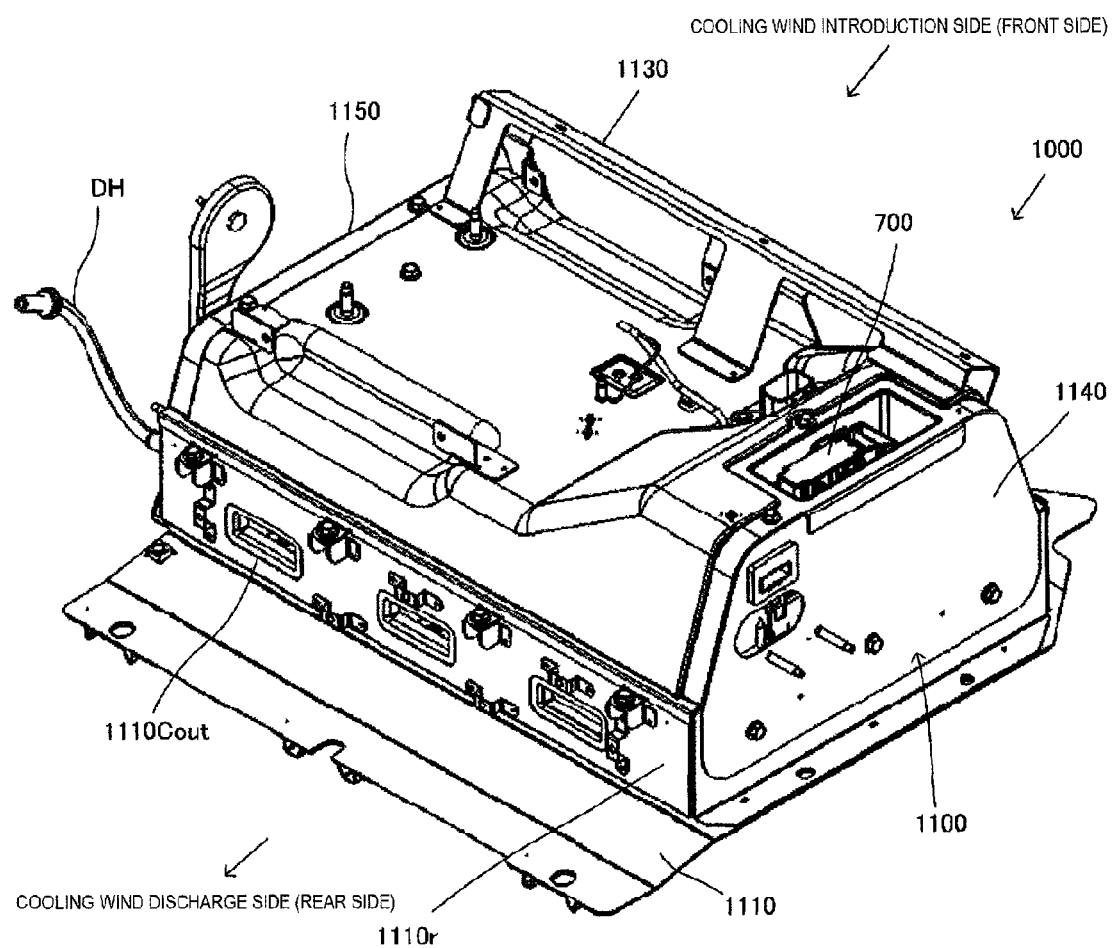
FIG. 2 is an external perspective view of the electric storage device.

The electric storage device 1000 is configured such that a battery module 100 for accumulating and releasing electric energy (charging and discharging the DC power), a control device 900 for managing (monitoring) and controlling a state of the battery module 100, a junction box 400, and a service disconnect switch 700 are housed in a module housing 1100 (FIG. 2).

The junction box 400 is an electronic part that is provided to connect the battery module 100 to the inverter device 20 and in which a relay mechanism is installed. The service disconnect switch 700 is a safety device that is provided to ensure safety during maintenance and inspection of the lithium-ion battery device 1000, and is formed of an electric circuit in which a switch and a fuse are electrically connected in series. An operation section 700S thereof is operated by a serviceman during the maintenance and inspection. The operation section 700S is exposed to a surface of the electric storage device 1000.

A detailed description will be made below on the electric storage device 1000 with reference to FIG. 2 to FIG. 14.

The battery module 100 is formed of first to third battery blocks 100a to 100c. The three battery blocks 100a to 100c are electrically connected in series. Noted that the first to third battery blocks 100a to 100c basically have the same configuration.

A detailed description will be made below on the battery module 100 with reference to FIG. 2 to FIG. 14.

The control device 900 includes a battery controller 300 and a cell controller 200.

The battery controller 300 manages (monitors) and controls a state of the lithium-ion battery device 1000 through the cell controller 200. In addition, the battery controller 300 notifies a charging/discharging control command that includes the state of the lithium-ion battery device 1000, allowable charging/discharging power, and the like to the vehicle controller 30 as the host control device and the motor controller 23. The battery controller 300 is driven by a power supply that is supplied from an auxiliary 12-V battery and a voltage of which is lower to a low voltage of about 5 V.

A current sensor 430 that is provided within the junction box 400 is provided to detect current supplied from the lithium-ion battery device 1000 to the inverter device 20. An output wire of the current sensor 430 is electrically connected to the battery controller 300. Based on a signal output from the current sensor 430, the battery controller 300 detects the current that is supplied from the lithium-ion battery device 1000 to the inverter device 20. This current detection information is notified from the battery controller 300 to the motor controller 23, the vehicle controller 30, and the like.

Figure 14:
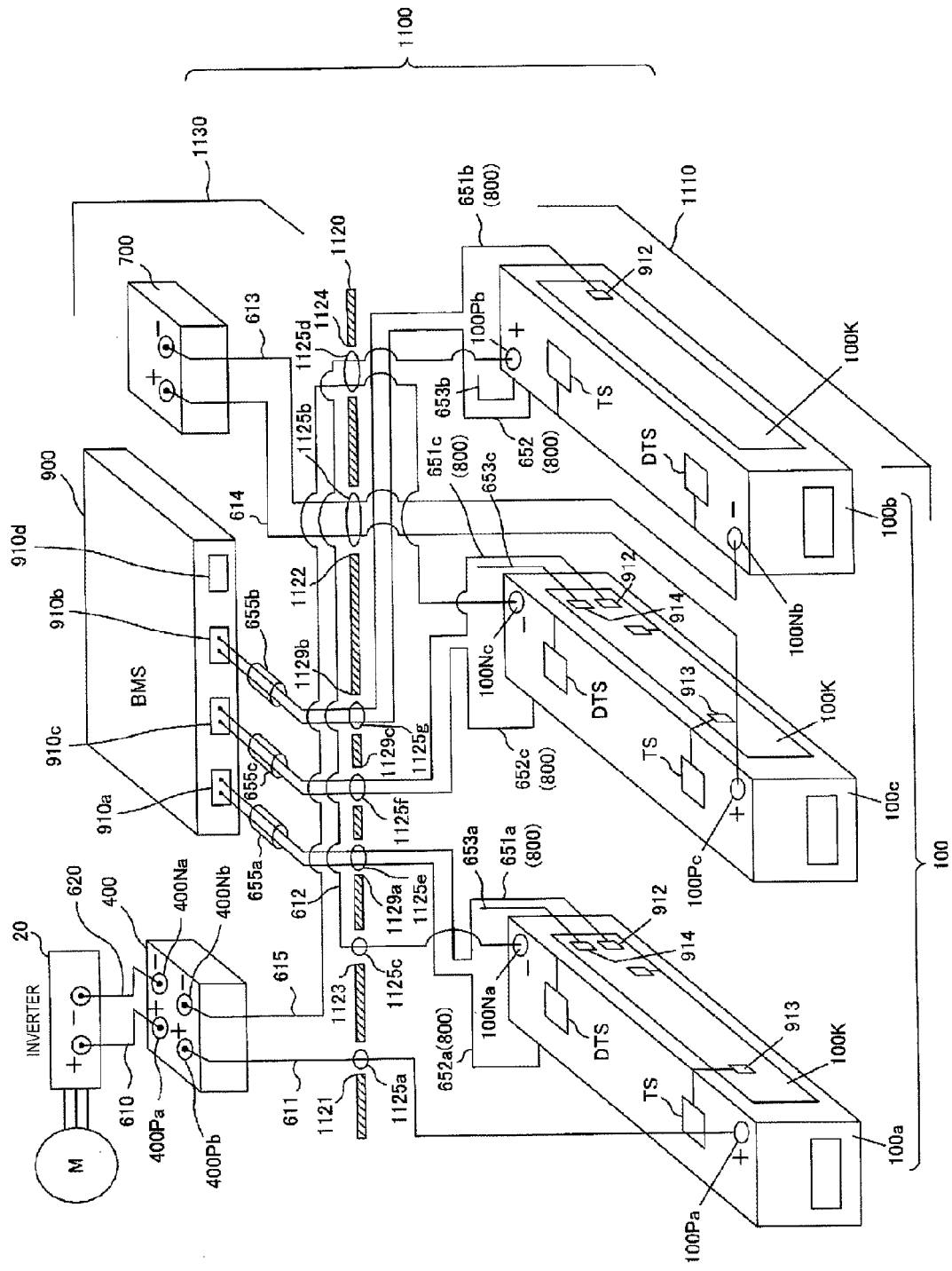
FIG. 14 is a view for explaining routing of wiring between a battery module in a lower chamber and electrical parts in an upper chamber of the electric storage device.

Management (monitoring) and control of the state of the lithium-ion battery device 1000 include: measurement of the voltage and current of the lithium-ion battery device 1000; computation of a state of charge (SOC), a state of health (SOH), and the like of the lithium-ion battery device 1000; measurement of a temperature of each battery block; output of a command to the cell controller 200 (for example, a command for measurement of voltage of each lithium-ion cell battery, a command for adjustment of a power storage amount of each lithium-ion cell battery, and the like); and the like. The cell controller 200 and the battery module 100 are electrically connected to each other through a connection wire 800 (FIG. 1 and FIG. 14).

A positive electrode side connection terminal of the first battery block 100a of the highest potential and the DC positive electrode side external terminal of the inverter device 20 are electrically connected to each other through a positive electrode side power supply cable 611, the junction box 400, and the positive electrode side power supply cable 610. A negative electrode side connection terminal of the third battery block 100c of the lower potential and the DC negative electrode side external terminal of the inverter device 20 are electrically connected to each other through a negative electrode side power supply cable 615, the junction box 400, and the negative electrode side power supply cable 620.

The above-described junction box 400 is provided between the positive electrode side power supply cables 610 and 611 and between the negative electrode side power supply cables 620 and 615. The relay mechanism that is formed of a positive electrode side main relay 411, a negative electrode side main relay 412, and a pre-charge circuit 420 is housed in the junction box 400. The relay mechanism is an opening/closing section that causes electrical conduction and blockage between the battery module 100 and the inverter device 20. During activation of the electric machine system for vehicle deployment, the relay mechanism causes the conduction between the battery module 100 and the inverter device 20. Alternatively, during a stop or occurrence of abnormality of the electric machine system for vehicle deployment, the relay mechanism blocks between the battery module 100 and the inverter device 20. Since the relay mechanism controls between the lithium-ion battery device 1000 and the inverter device 20 as described above, a high safety level of the electric machine system for vehicle deployment can be ensured.

The relay mechanism is driven and controlled by the motor controller 23. During the activation of the electric machine system for vehicle deployment, the motor controller 23 receives notification of completed activation of the lithium-ion battery device 1000 from the battery controller 300. Accordingly, the motor controller 23 outputs a conduction command signal to the relay mechanism and drives the relay mechanism. In addition, during the stop of the electric machine system for vehicle deployment, the motor controller 23 receives an OFF output signal from an ignition key switch. Furthermore, during the occurrence of abnormality of the electric machine system for vehicle deployment, the motor controller 23 receives an abnormality signal from the vehicle controller 30. Thus, in either case, the motor controller 23 outputs a blockage command signal to the relay mechanism, and drives the relay mechanism.

The positive electrode side main relay 411 is provided in the circuit of the positive electrode side power supply cables 610 and 611, and controls electrical connection between the positive electrode side of the lithium-ion battery device 1000 and the positive electrode side of the inverter device 20. The negative electrode side main relay 412 is provided in the circuit of the negative electrode side power supply cables 620 and 615, and controls electrical connection between the negative electrode side of the lithium-ion battery device 1000 and the negative electrode side of the inverter device 20.

The pre-charge circuit 420 is a series circuit in which a pre-charge relay 421 and a resistor 422 are electrically connected in series, and is electrically connected to the positive electrode side main relay 411 in parallel.

Upon the activation of the electric machine system for vehicle deployment, the negative electrode side main relay 412 is first energized, and then the pre-charge relay 421 is energized. In this way, the current supplied from the lithium-ion battery device 1000 is limited by the resistor 422 before being supplied to and charged in the smoothing capacitor 24, which is installed in the inverter. After the smoothing capacitor 24 is charged to a specified voltage, the positive electrode side main relay 411 is energized, and the pre-charge relay 421 is de-energized. In this way, main current is supplied from the lithium-ion battery device 1000 to the inverter device 20 through the positive electrode side main relay 411.

—Details of Electric Storage Device 1000—

Figure 3:
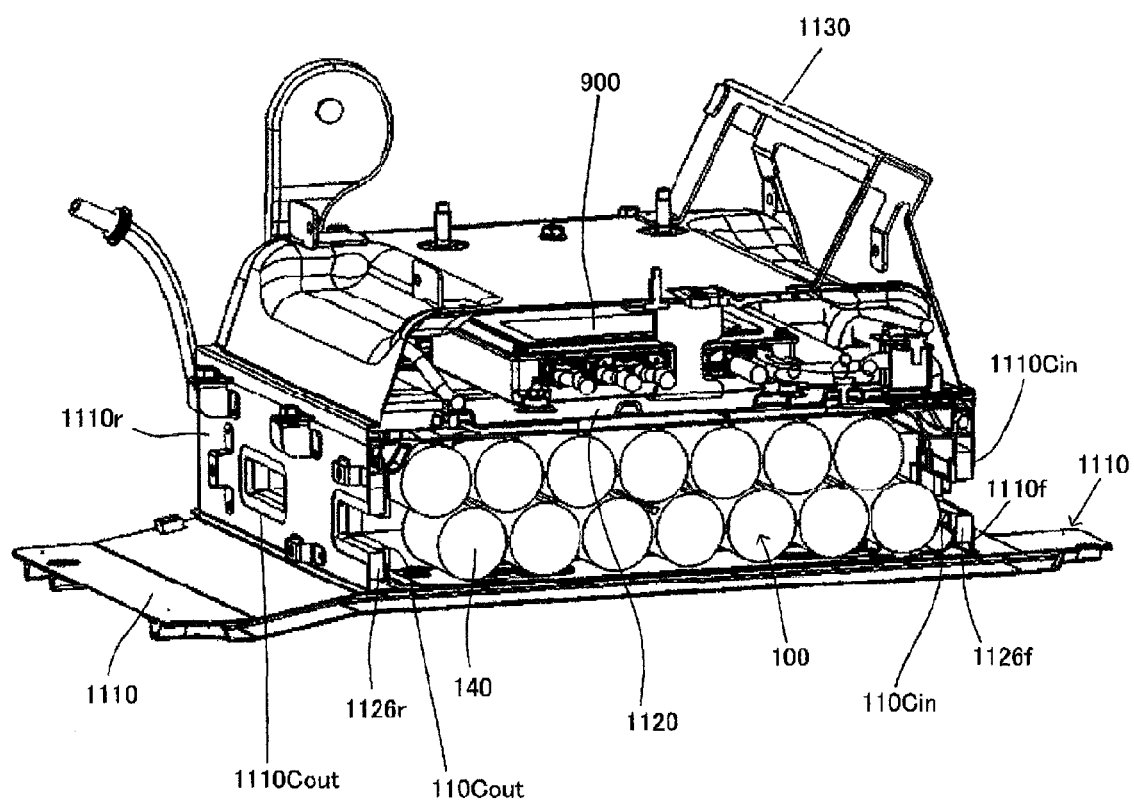
FIG. 3 is a breakaway perspective view of the inside of the electric storage device in FIG. 2.
Figure 4:
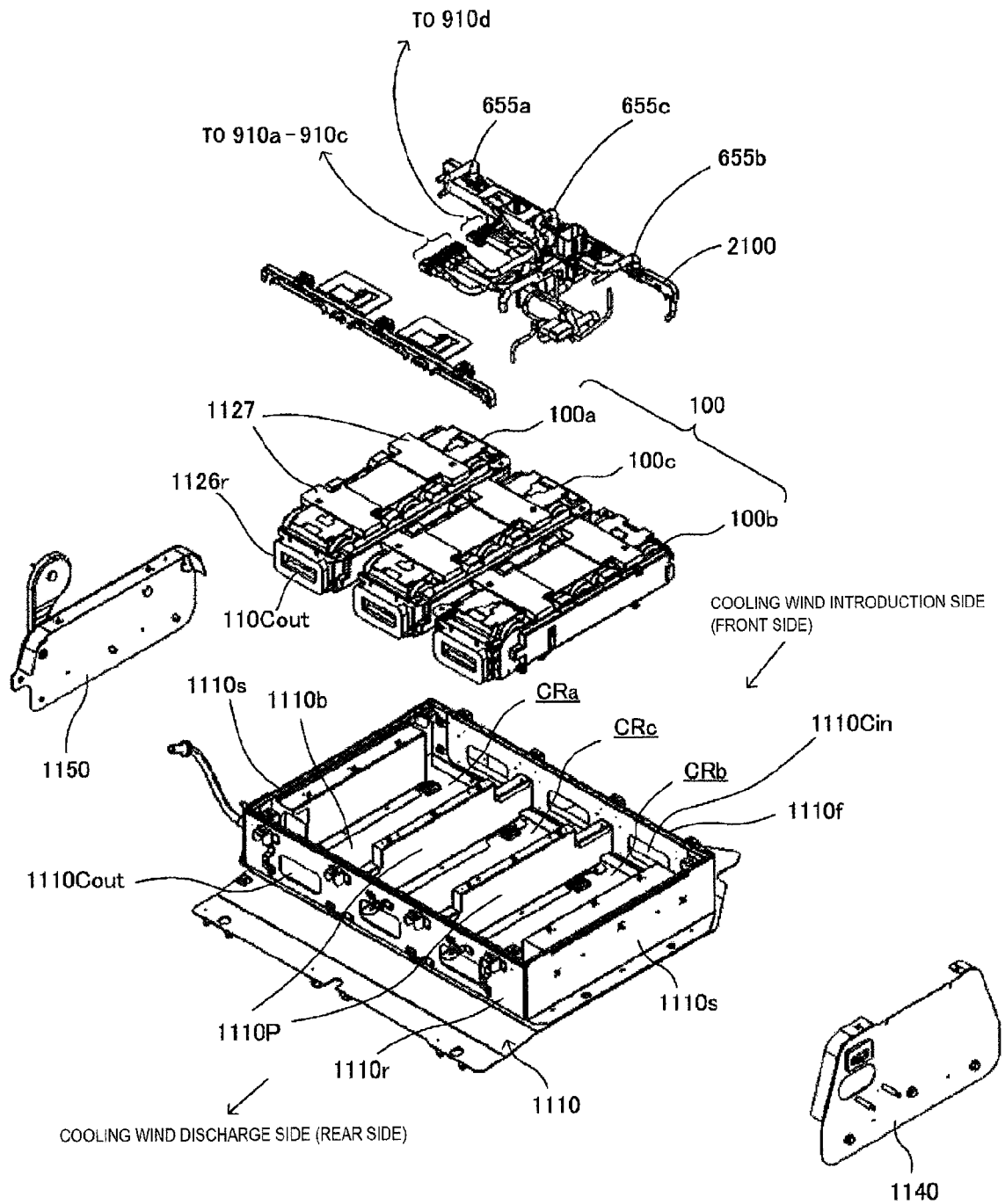
FIG. 4 is an exploded perspective view of parts that are located below a middle base plate of the electric storage device in FIG. 2.
Figure 5:
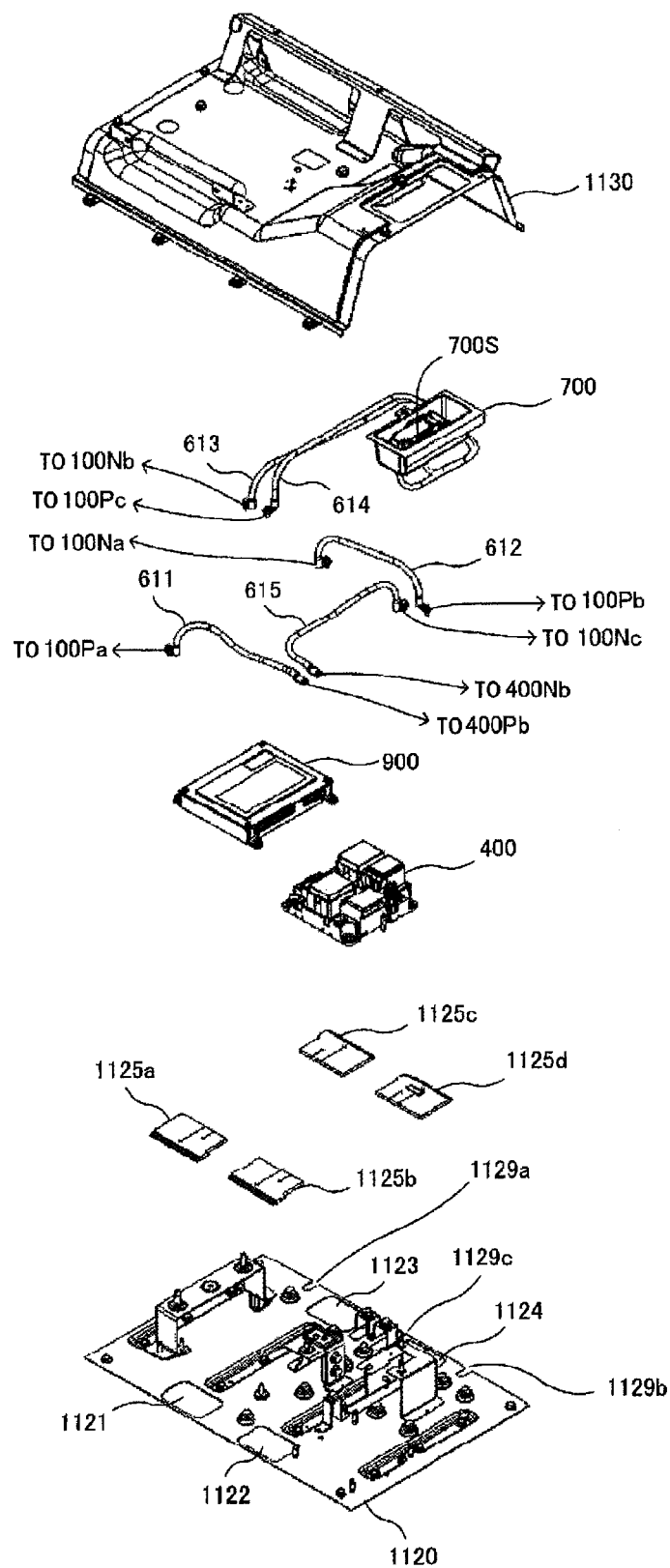
FIG. 5 is an exploded perspective view of parts that are located on or above the middle base plate of the electric storage device in FIG. 2.

The electric storage device 1000 will be described in detail with reference to FIG. 2 to FIG. 14. FIG. 2 is an external perspective views of the entire electric storage device 1000, that is, the lithium-ion battery device 1000. FIG. 3 is a vertical cross-sectional view of the inside thereof. FIG. 4 and FIG. 5 are exploded perspective views of the electric storage device 1000.

As shown in FIG. 3 to FIG. 5, the battery module 100 and the control device 900 are housed in the housing (case) 1100 of the electric storage device 1000. The housing 1100 includes a lower housing (lower case) 1110, a middle base plate (middle base) 1120, and an upper housing (upper case) 1130. The lower housing 1110 has first to third battery chambers CRa to CRc in which the first battery block 100a to the third battery block 100c of the battery module 100 are respectively housed. The intermediate base plate 1120 seals the first to third battery chambers CRa to CRc of the lower housing 1110, and electrical parts, such as the control device, that is, the battery management device 900, the junction box 400, and the service disconnect switch 700, are mounted on an upper surface thereof. The upper housing 1130 protects the electrical parts, which are mounted on the middle base plate 1120, against dust.

(Housing 1100)

As shown in FIG. 4, the lower housing 1110 is a rectangular box whose upper surface is opened, and is formed of one bottom surface 1110b and four wall plates that surround the one bottom surface 1110b, which are a front wall 1110f, a rear wall 1110r, and a pair of side walls 1110s. Two partitioning walls 1110P are vertically arranged on the bottom surface 1110b. The first battery chamber CRa is formed between the partitioning wall 1110P and one of the side walls 1110s, the third battery chamber CRc is formed between the partitioning walls 1110P, and the second battery chamber CRb is formed between the partitioning wall 1110P and the other of the side wall 1110s. The first to third battery blocks 100a to 100c are respectively provided in the first to third battery chambers CRa to CRc as described above.

Three cooling wind introduction ports 1110Cin are formed in the front wall 1110f of the lower housing 1110 that defines the first to third battery chambers CRa to CRc. Three cooling wind discharge ports 1110Cout are formed in the rear wall 1110r of the lower housing 1110 that defines the first to third battery chambers CRa to CRc. These three cooling wind introduction ports 1110Cin respectively face cooling wind introduction ports 110Cin of the first to third battery blocks 100a to 100c, and these three cooling wind discharge ports 1110Cout respectively face cooling wind discharge ports 110Cout of the first to third battery blocks 100a to 100c.

Figure 11:
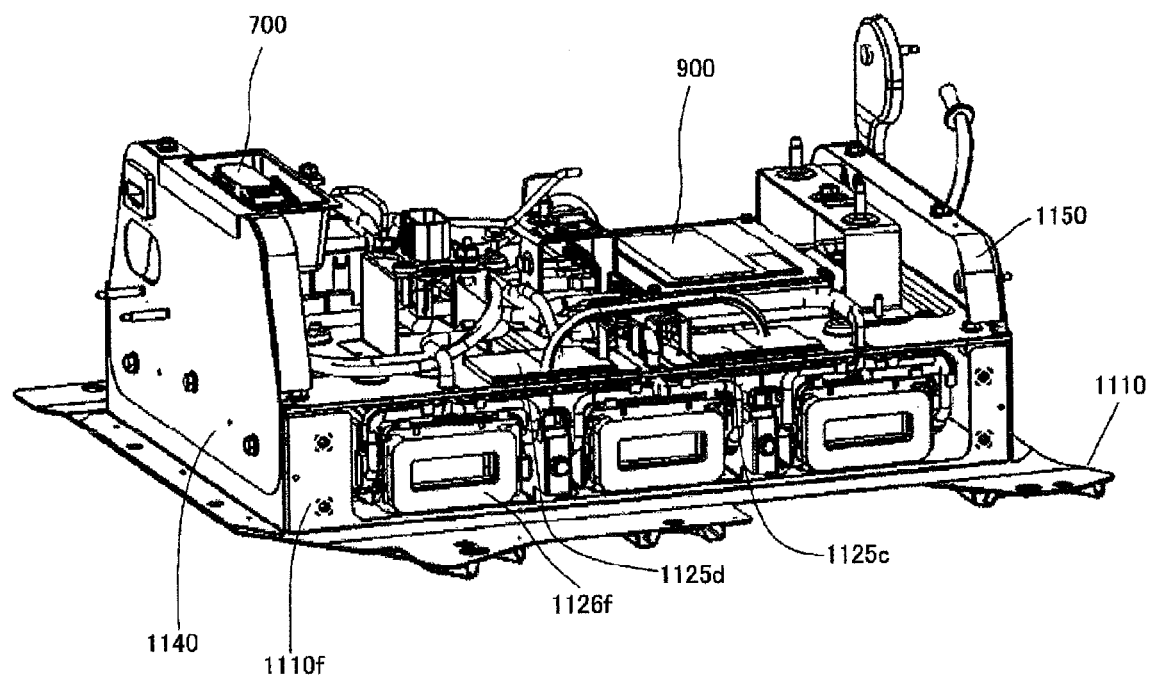
FIG. 11 is a perspective view of the electric storage device from which the upper housing is removed and that is seen from a cooling wind introduction port side.

A description will be made with reference to FIG. 3, FIG. 11, and FIG. 12. A sealing member 1126f is interposed between the cooling wind introduction port 1110Cin of the front wall 1110f of the lower housing 1110 and the cooling wind introduction port 110Cin of each battery block, the sealing member 1126f being formed in a rectangular annular shape and formed of an elastic material such as rubber. A sealing member 1126r is interposed between the cooling wind discharge port 1110Cout of the rear wall 1110r of the lower housing 1110 and the cooling wind discharge port 110Cout of each battery block, the sealing member 1126r being formed in a rectangular annular shape and formed of an elastic material such as rubber. Due to the adoption of these sealing members, the front wall 1110f of the lower housing 1110 and the cooling wind introduction ports 110Cin of the battery blocks 100a to 100c are connected in a tightly closed state, and the rear wall 1110r of the lower housing 1110 and the cooling wind discharge ports 110Cout of the battery blocks 100a to 100c are connected in a tightly closed state without use of a duct or the like.

Figure 12:
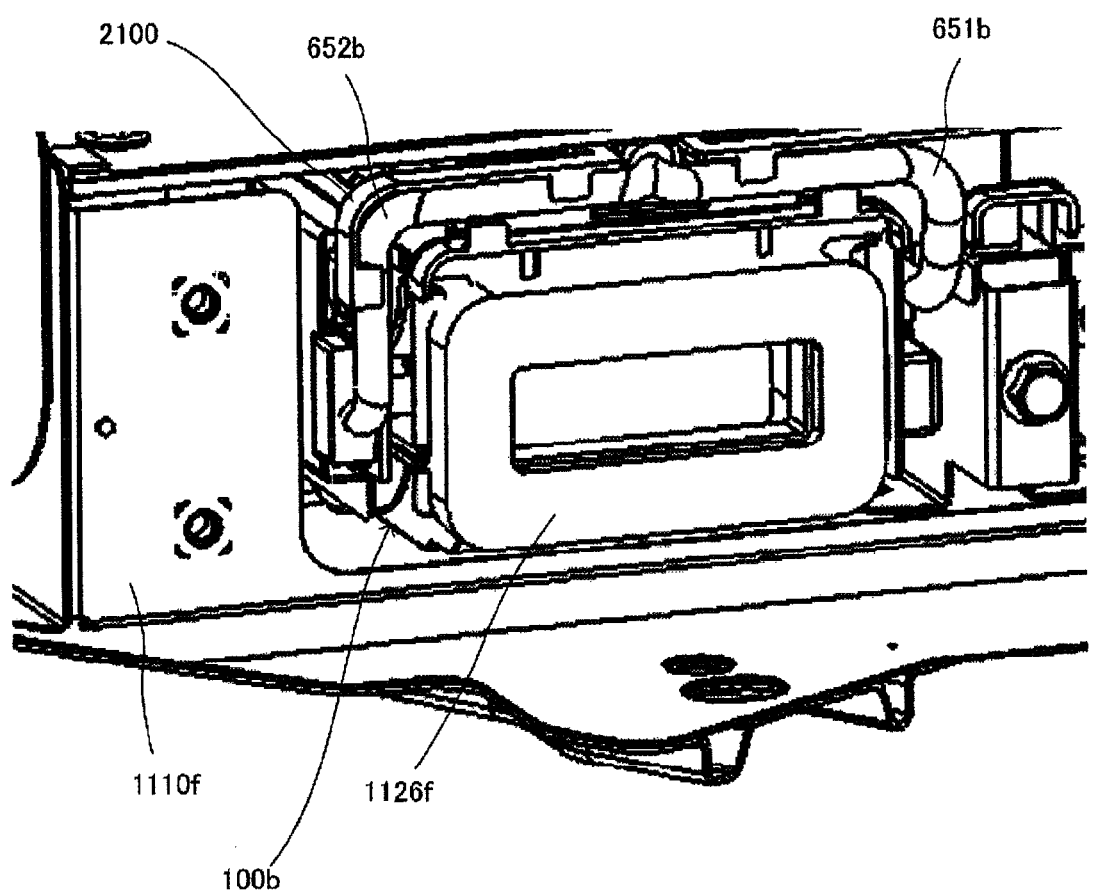
FIG. 12 is an enlarged view of a main section in which a portion of the cooling wind introduction port is enlarged.
Figure 13:
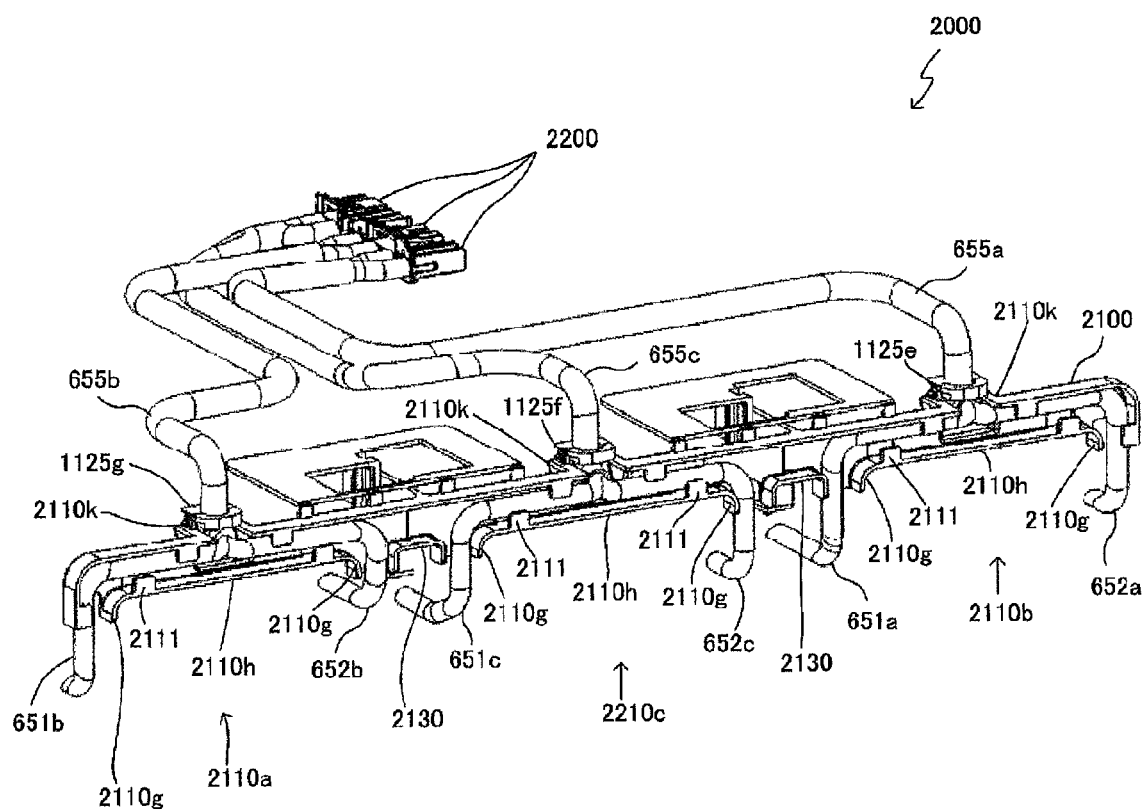
FIG. 13 is a perspective view of a holder for a voltage signal harness.

Noted that the sealing member 1126f on the cooling wind introduction port side is shown in detail in FIG. 12 and FIG. 13.

(Battery Block)

The battery blocks 100a to 100c that constitute the battery module 100 will be described with reference to FIG. 6 and FIG. 7. The battery blocks 100a to 100c have substantially the same configuration.

Each of the first to third battery blocks 100a to 100c has plural cell batteries 140 (see FIG. 3) that are arranged in parallel in upper and lower stages within a slender cell housing 110 in a substantially hexahedron shape. The plural cell batteries 140 are connected in series to constitute one battery pack. In other words, the battery pack is collection of the plural lithium-ion cell batteries 140 (a lithium-ion cell battery group), and is disposed in an orderly manner within the cell housing 110.

A group of the plural cell batteries 140 on the upper stage is referred to as an upper stage cell arrangement body, and a group of the plural cell batteries 140 on the lower stage is referred to as a lower stage cell arrangement body.

The lithium-ion cell battery 140 is a column-shaped structure, and is configured that components, such as a battery element and a safety valve, are housed in a battery case into which an electrolyte is poured. Positive and negative electrode terminals are formed on both ends of the battery case. The positive and negative electrode terminals of the plural cell batteries 140 are electrically connected in series by plural conductive members referred to as bus bars BB. The bus bar BB is welded to the positive electrode of one cell battery 140 and the negative electrode of another cell battery 140.

The positive electrode terminal and the negative electrode terminal of each cell battery 140 are each provided with a safety valve that is opened when an internal cell pressure is a specified value or higher.

Noted that a battery capacity of each battery block may differ in accordance with a required capacity of the battery module 100. In this case, since a common cell housing is used, some of the cell batteries are configured as dummy cells having no function of charging and discharging. For example, if the 12 cell batteries and the two dummy cells are provided in the third battery block 100c, the cell housing 110 of each of the first and second battery blocks 100a, 100b, each of which is formed of the 14 cell batteries, can also be used for the third battery block 100c.

A description will be made on the cell housing of the battery block with reference to FIG. 6(b).

The cell housing 110 is formed of three frame members, which are a lower holding frame 110L, a middle holding frame 110M, an upper holding frame 110U. The cell batteries 140 in the lower stage cell arrangement body are held between the lower holding frame 110L and the middle holding frame 110M. The cell batteries 140 in the upper stage cell arrangement body are held between the upper holding frame 110U and the middle holding frame 110M. Both ends in a longitudinal direction of the middle holding frame 110M are provided with the cooling wind introduction port 110Cin for cooling the battery pack and the cooling wind discharge port 110Cout (see FIG. 3).

A description will be made on the cell arrangement of the battery block with reference to FIG. 3 and FIG. 6(b).

In this embodiment, for example, the 14 cylindrical lithium-ion cell batteries 140 are arranged in the orderly manner within each cell housing 110 to constitute the battery pack. More specifically, the seven lithium-ion cell batteries 140 are arranged in parallel to constitute an upper stage cell arrangement body in a state that each lithium-ion cell battery 140 is laid sideways such that a center axis thereof extends in a short direction of the cell housing 110. In addition, similar to the upper stage cell arrangement body, the seven lithium-ion cell batteries 140 are arranged to constitute a lower stage cell arrangement body.

The upper stage cell arrangement body and the lower stage cell arrangement body are displaced from each other in the longitudinal direction of the cell housing 110. In other words, the upper stage cell arrangement body is arranged to be displaced to the cooling wind introduction port 110Cin side or the cooling wind discharge port 110Cout side with respect to the lower stage cell arrangement body. On the other hand, the lower stage cell arrangement body is arranged to be displaced to the cooling wind discharge port 110Cout side or the cooling wind introduction port 110Cin side with respect to the upper stage cell arrangement body.

In an example of FIG. 6(b), a position of a center axis in the longitudinal direction of a lithium-ion cell battery 140a, which is located closest to the cooling wind outlet 110Cout side in the upper stage cell arrangement body, is a middle position between a center axis of a lithium-ion cell battery 140b, which is located closest to the cooling wind outlet 110Cout side, and a center axis of a lithium-ion cell battery 140c, which is adjacent to the lithium-ion cell battery 140b in the lower stage cell arrangement body. In this way, the upper stage cell arrangement body and the lower stage cell arrangement body are displaced from each other in the longitudinal direction.

The lithium-ion cell batteries 140 that constitute the upper stage cell arrangement body are arranged in parallel such that directions of the terminals are alternately reversed.

Similarly, the lithium-ion cell batteries 140 that constitute the lower stage cell arrangement body are arranged in parallel such that directions of the terminals are alternately reversed.

As described above, the upper stage cell arrangement body and the lower stage cell arrangement body are arranged to be displaced in the longitudinal direction. Accordingly, a dimension in a height direction of the battery pack can be reduced, and thus the first to third battery blocks 100a to 100c can be downsized in the height direction.

Figure 6:
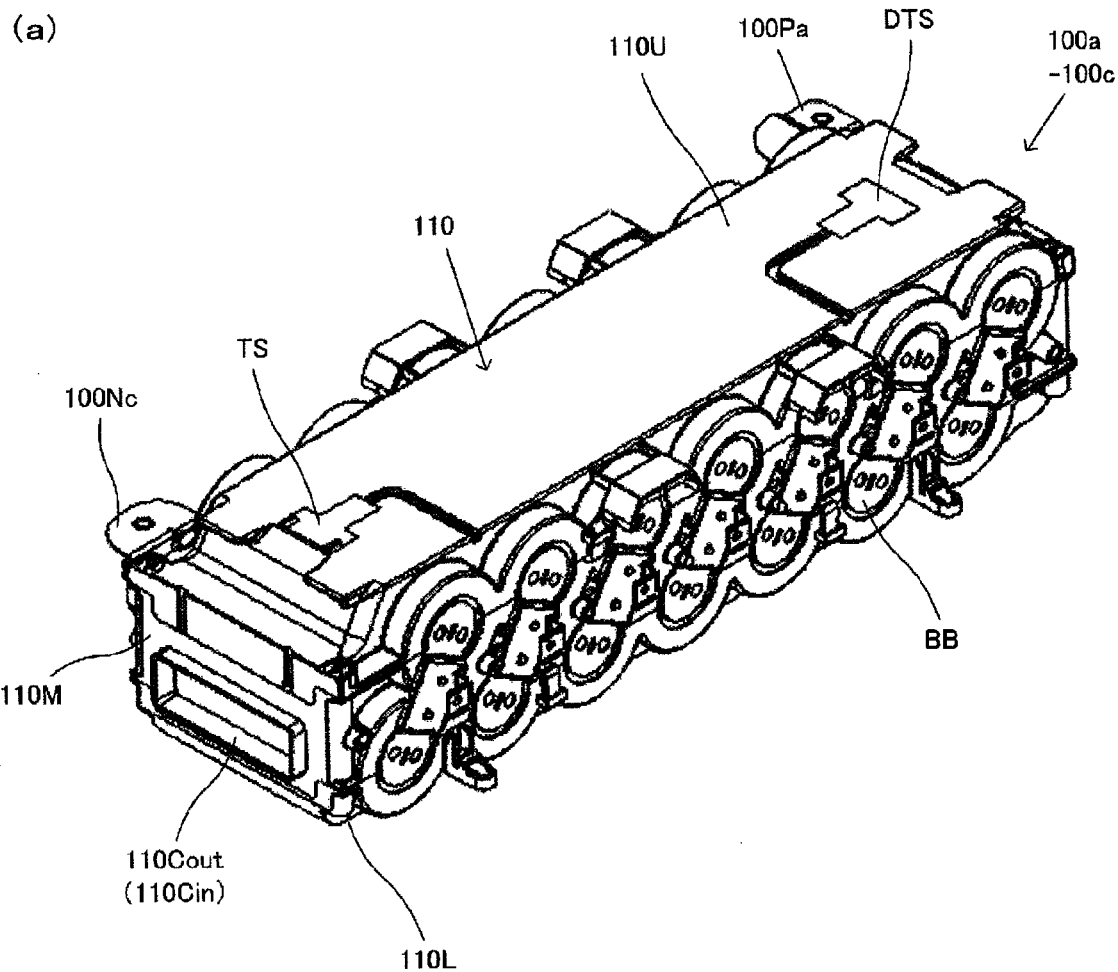
FIG. 6(*a*) is a perspective view of a battery block, and FIG. 6(*b*) is a view of arrangement of cell batteries.
Figure 6:
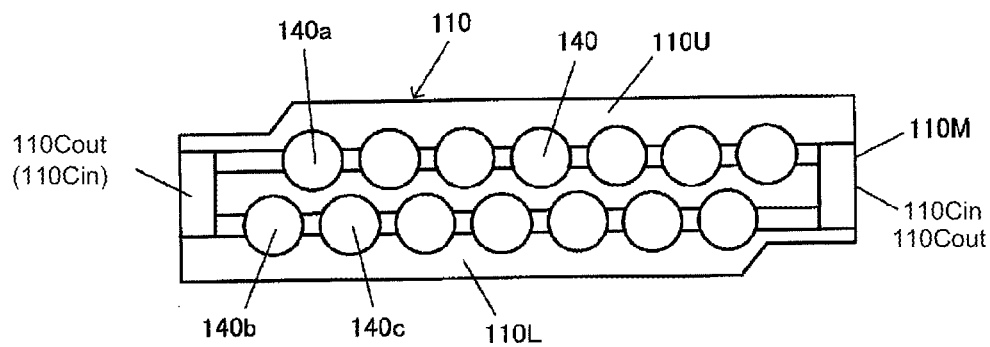

As shown in FIG. 6, each of the battery blocks 100a to 100c is provided with: a positive electrode side connection terminal 100P that is connected to the positive electrode of the cell on the highest potential side in the battery pack; and a negative electrode side connection terminal 100N that is connected to the negative electrode of the cell on the lowest potential side in the battery pack. The positive electrode side and negative electrode side power supply cables are respectively connected to these positive and negative electrode side connection terminal 100P and 100N. In this way, the battery module 100 in which the three battery packs are connected in series are constituted.

(Detector of Cell Voltage and Cell Temperature)

Figure 7:
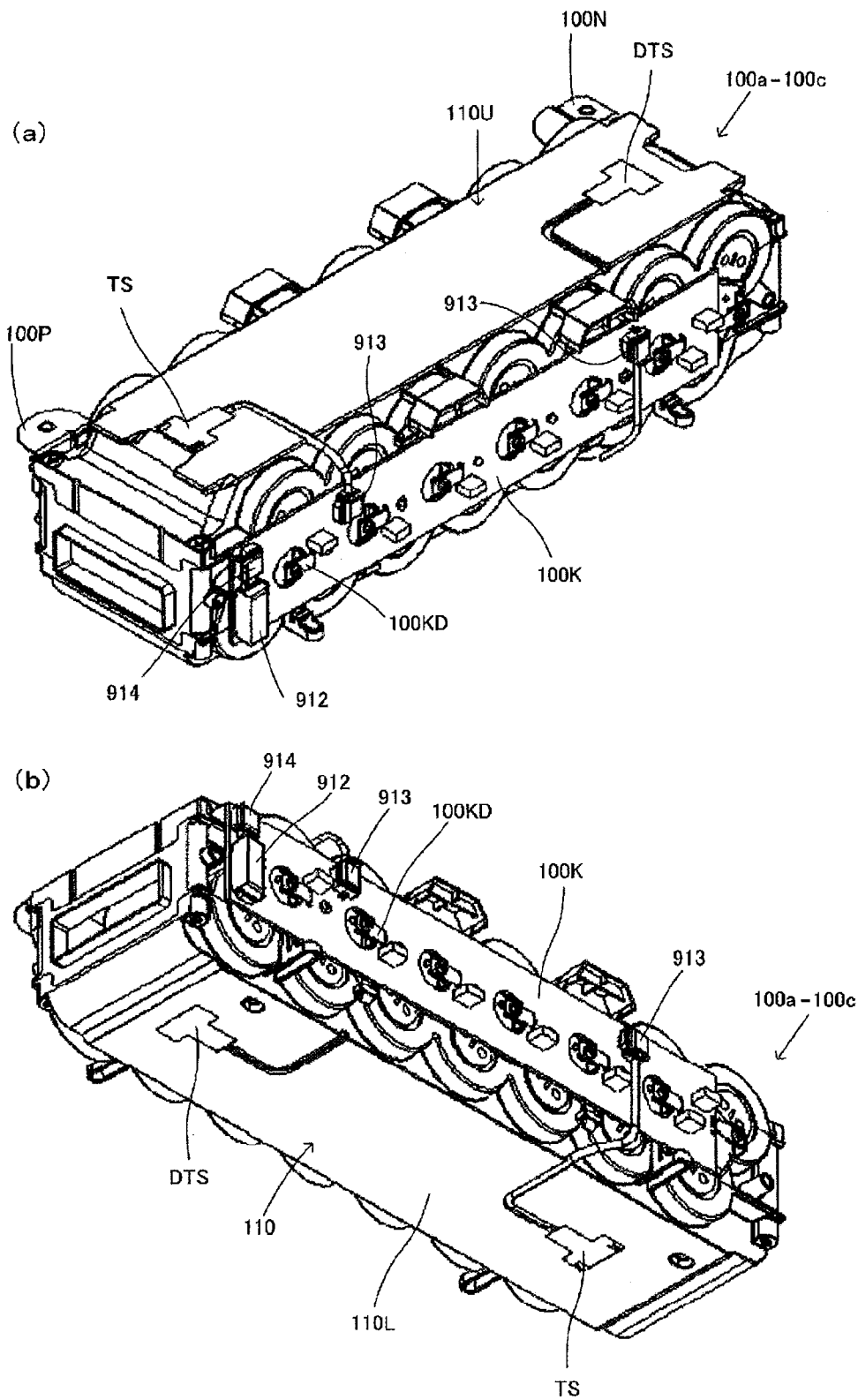

As shown in FIG. 7, a circuit board 100K is provided on each of right and left side surfaces of the cell housing 110. Each of these boards 100K is provided with a voltage detection conductor 100KD for each cell that is connected to the bus bar BB by screw. The bus bar BB is welded to the positive or negative electrode terminal of each cell battery 140 in each battery block. This voltage detection conductor KD is connected to a voltage signal conductor pattern provided on the board 100K. Each board 100K is provided with a voltage signal connector 912 that is connected to the plural voltage signal conductor patterns. The voltage of each cell battery 140 is transmitted to the control device 900 by any of voltage detection harnesses 655a to 655c that are connected to the voltage signal connector 912 as will be described below.

Meanwhile, each of the battery blocks 100a to 100c is provided with temperature sensors TS (see FIG. 1, FIG. 6, and FIG. 7) in the vicinity of the cooling wind inlet and the cooling wind outlet in the upper holding frame 110U and the lower holding frame 110L for the cells. A signal line of each temperature sensor TS is connected to a temperature signal connector 913 on the board 100K, which is provided on the one side surface of the cell housing 110. These temperature signal connectors 913 are connected to a temperature signal conductor pattern provided on the board 100K. The board 100K is also provided with a temperature signal connector 914 that is connected to the temperature signal conductor pattern. As will be described below, a temperature of the cell battery 140 is transmitted to the control device 900 by any of temperature detection harnesses 653a to 653c that are connected to the temperature signal connector 914 as will be described below.

Figure 8:
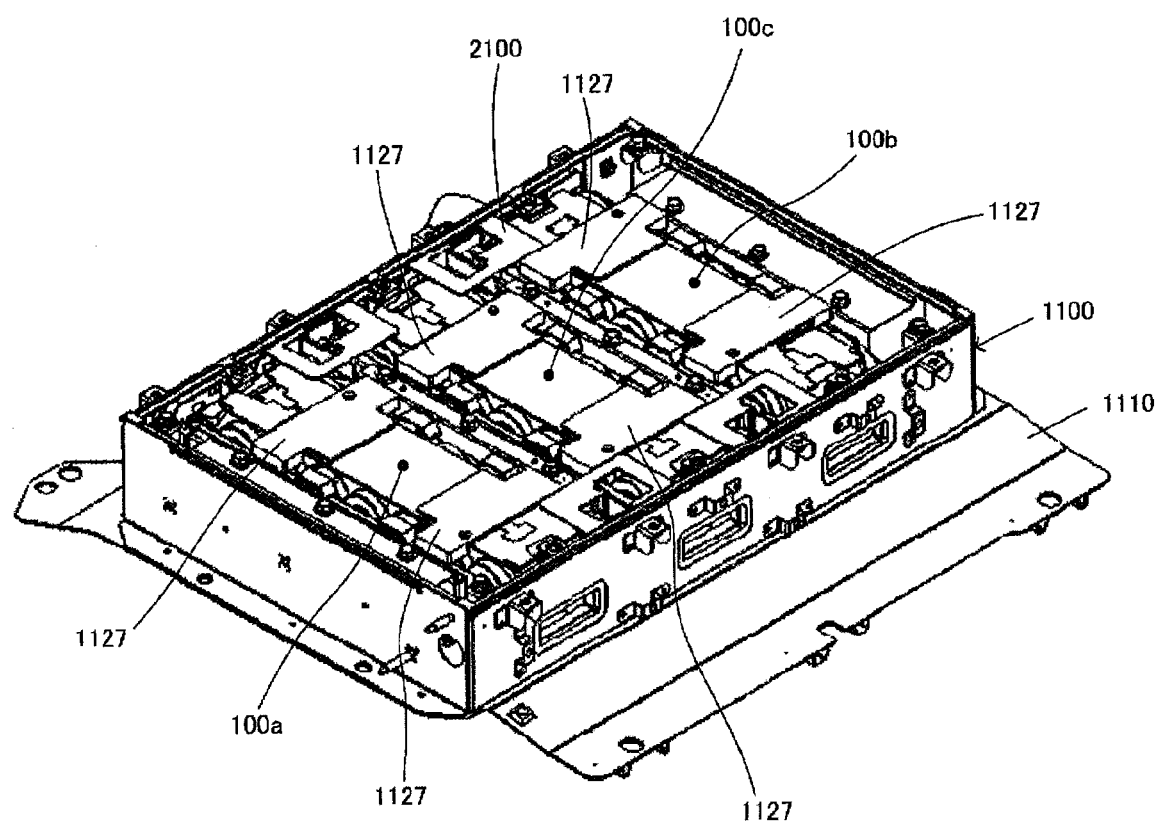
FIG. 8 is a perspective view of the electric storage device from which the middle base plate is removed and that is seen diagonally from above.

FIG. 8 shows the first to third battery blocks 100a to 100c that are respectively housed in the battery chambers CRa to CRc of the lower housing 1110. On an upper surface of each of the first to third battery blocks 100a to 100c, a sealing member 1127 is provided that is formed of an elastic material such as rubber and formed as a rectangular flat plate.

Figure 9:
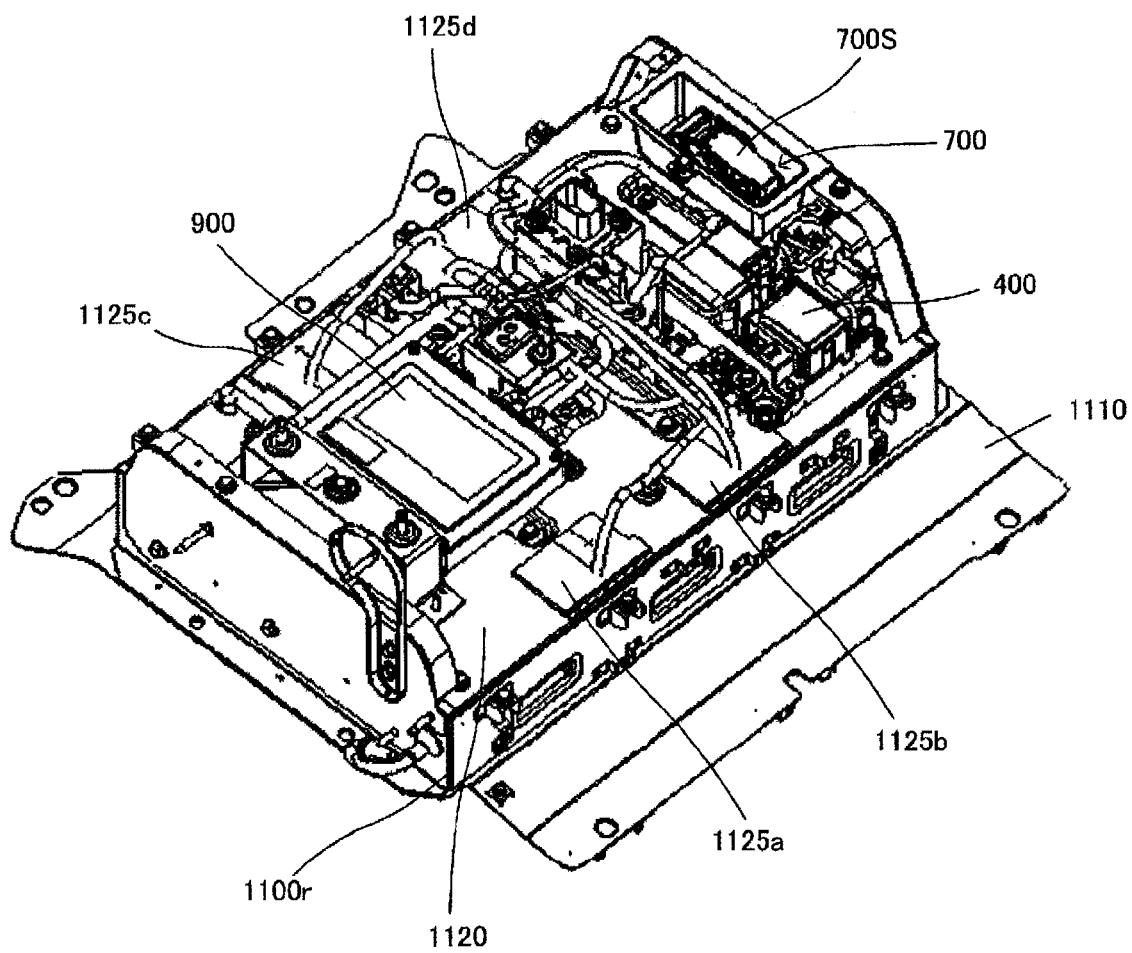
FIG. 9 is a perspective view of the electric storage device from which an upper housing is removed and that is seen diagonally from above.
Figure 10:
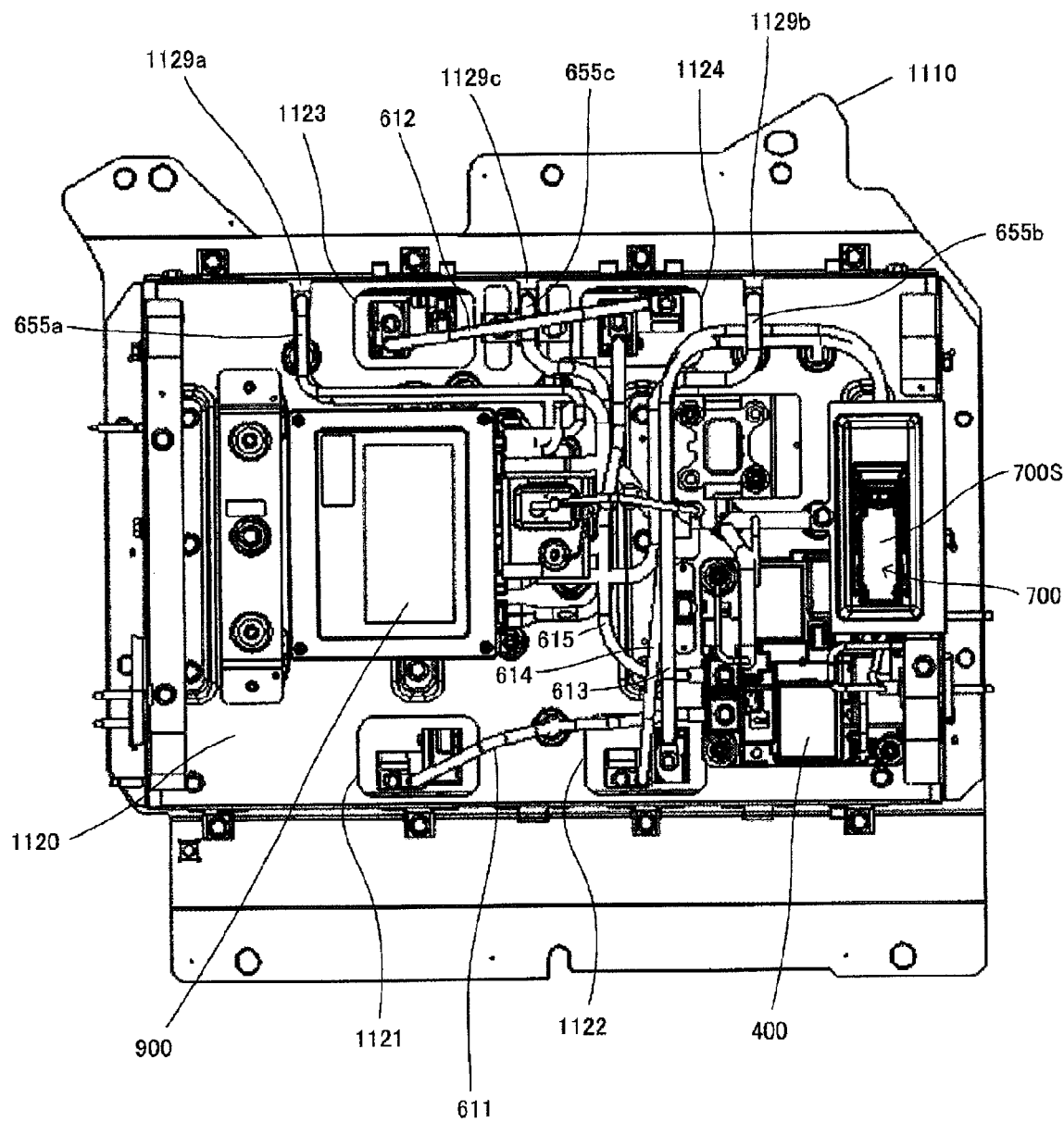
FIG. 10 is a plan view of the electric storage device from which the upper housing is removed and that is seen diagonally from above.

FIG. 9 and FIG. 10 are views in which the upper housing 1130 is removed and that show the electrical parts as well as strong current system wiring and weak current system wiring on the middle base plate 1120. FIG. 11 is a view in which the upper housing 1130 is removed and a rear cover as a component of the lower housing 1110 is further removed. As will be described below, the strong current system wiring penetrates strong current system openings 1121 to 1124 and is routed from the battery blocks 100a to 100c in a lower chamber to the electrical parts, such as the control device 900, in the upper chamber. In addition, the weak current system wiring penetrates weak current system notches (openings) 1129a to 1129c and is routed.

As shown in FIG. 5, FIG. 9, FIG. 11, and FIG. 14, these strong current system openings 1121 to 1124 are respectively provided with sealing members 1125a to 1125d, and the lower chamber is thus sealed with respect to the upper chamber. Although not shown in FIG. 5, as shown in FIG. 13 and FIG. 14, the weak current system notches 1129a to 1129c are respectively provided with sealing members 1125e to 1125g, and the lower chamber is thus sealed with respect to the upper chamber.

FIG. 12 is an enlarged perspective view of a main section in which the second battery block 100b of the electric storage device 1000 is seen from the cooling wind introduction port. FIG. 13 is a view for explaining a harness holder 2100 that holds two voltage signal harnesses for each battery block by the lower housing 1110.

The harness holder 2100 is provided along an upper edge of the front wall 1110f of the lower housing 1110. The harness holder 2100 has three guides 2110a to 2110c, each of which guides the harness for the battery block. Each of the guides 2110a to 2110c has: a right and left pair of folding guides 2110g that folds one of pairs of the voltage signal harnesses 651a and 652a, 651b and 652b, and 651c and 652c to the battery block center side, each of the pairs of the voltage signal harnesses 651a and 652a, 651b and 652b, and 651c and 652c being routed upward from right and left side surfaces on the cooling wind introduction port side of the battery block; and a support member 2110h that supports the harness folded by this guide 2110g and a guide 2130 in a horizontal direction along an opening edge of the lower housing 1110. The support member 2110h is provided with a harness stopper 2111.

In addition, the harness holder 2100 is provided with harness aggregation sections 2100K at positions that respectively correspond to the notches 1129a to 1129c formed in the middle base plate 1120. The two harnesses are aggregated to one harness in this harness aggregation section 2100K and routed from the lower chamber to the upper chamber.

In other words, the two voltage signal harnesses 651a and 652a, which are used for the first battery block 100a, are bundled into one harness 655a by the harness holder 2100 in the lower chamber. Similarly, the harnesses 651b and 652b of the second battery block 100b are bundled into one harness 655b by the harness holder 2100 in the lower chamber. Furthermore, the harnesses 651c and 652c of the third battery block 100c are bundled into one harness 655c by the harness holder 2100 in the lower chamber. A connector 2200 at tips of the harnesses 655a to 655c is connected to connectors 910a to 910c of the control device 900.

Although not shown in FIG. 12 and FIG. 13, each of the temperature signal harnesses 653a to 653c (see FIG. 14) that is connected to the temperature signal connector 914 on the one board 100K of each battery block is bundled with the voltage signal harness 651a to 651c (or 652a to 652c) in the lower chamber, the voltage signal harness 651a (or 652a) being connected to the voltage signal connector 912 on the same board 100K. One of the temperature signal harnesses 653a to 653c is connected to the temperature signal connector 914 that is provided on each of the boards 100K of the first to third battery blocks 100a to 100c. These temperature signal harnesses 653a to 653c are connected to a temperature detection connector 910d of the control device 900 via a connector (not shown).

(Routing of Strong Current System Wiring and Weak Current System Wiring)

A description will hereinafter be made on electrical parts in the electric storage device 1000 with reference to FIG. 14. FIG. 14 shows routing paths of the strong current system power supply cables and the weak current system harnesses that are routed between the housing lower chamber and the housing upper chamber.

The strong current system wiring is routed as follows.

The battery module 100 in the housing lower chamber is connected to the inverter device 20 via the junction box 400 in the housing upper chamber. A positive electrode external terminal 400Pa of the junction box 400 and a positive electrode DC terminal of the inverter device 20 are connected by a power supply cable 610 on the outside of the housing. A negative electrode external terminal 400Na of the junction box 400 and a negative electrode DC terminal of the inverter device 20 are connected by a power supply cable 620 on the outside of the housing.

A positive electrode internal terminal 400Pb of the junction box 400 is connected to the positive electrode side connection terminal 100P of the first battery block 100a, which has the highest potential of the battery module 100, within the housing by an internal power supply cable 611. A negative electrode internal terminal 400Nb of the junction box 400 is connected to the negative electrode side connection terminal 100N of the third battery block 100c, which has the lowest potential of the battery module 100, within the housing by an internal power supply cable 615.

The negative electrode terminal of the service disconnect switch 700 is connected to a negative electrode side connection terminal 100Nb of the second battery block 100b, which has the middle potential, within the housing by an internal power supply cable 613. The positive electrode terminal of the service disconnect switch 700 is connected to a positive electrode side connection terminal 100Pc of the third battery block 100c, which has the lowest potential, within the housing by an internal power supply cable 614.

The negative electrode side connection terminal 100Na of the first battery block 100a, which has the highest potential, is connected to a positive electrode side connection terminal 100Pb of the second battery block 100b, which has the middle potential, by an internal power supply cable 612.

The internal power supply cable 611 penetrates the opening 1121 that is provided in the middle base plate 1120. The internal power supply cable 612 penetrates the openings 1123 and 1124 that are provided in the middle base plate 1120. The internal power supply cables 613 and 614 penetrate an opening 1122 that is provided in the middle base plate 1120. The sealing members 1125a to 1125d are respectively attached to the openings 1121 to 1124, and thus the lower chamber is sealed with respect to the upper chamber.

The weak current system wiring is routed as follows.

The six voltage signal connectors 912, two each of which are provided in the paired boards 100K of each of the battery blocks 100a to 100c, and the voltage signal connectors 910a to 910c of the control device 900 are respectively connected by the harnesses 655a to 655c, each of which has the connector 2200 at both ends. The temperature signal connectors 914 and the temperature signal connector 910d of the control device 900 are connected by the temperature signal harnesses 653a to 653c, each of which has the connector at both ends.

As also shown in FIG. 10, the notches 1129a to 1129c that are respectively penetrated by the three voltage detection harnesses 655a to 655c are provided as the weak current system openings at an edge on one end side of the middle base plate 1120. The voltage signal harnesses 655a to 655c, which are bundled into one, respectively penetrate the notches 1129a to 1129c, which are formed at the end of the middle base plate 1120, and is routed to the upper chamber.

The notches 1129a to 1129c are respectively provided with the sealing members 1125e to 1125g, and thus the lower chamber is sealed with respect to the upper chamber.

(Operations and Effects of the Embodiment)

A description will be made on operations and effects of the electric storage device of the embodiment, which has been described so far.

The electric storage device for vehicle deployment 1000 of the embodiment supplies the DC power to the motor 10, which is controlled by the inverter device 20, and stores charging power from the motor generator 10. In this electric storage device for vehicle deployment, the upper chamber and the lower chamber are provided by the middle base plate 1120 in the housing 1100. The lower chamber is sealed with respect to the upper chamber by the middle base plate 1120. The battery module 100 is disposed in the lower chamber. The electrical parts, such as the control device 900 including a cell controller and the like, the junction box 400 and the service disconnect switch 700, are mounted in the upper chamber. The several types of wiring that connect the battery module 100 and the electrical parts penetrate the strong current system openings and the weak current system openings of the middle base plate 1120, and are connected to the electrical parts in the upper chamber. The sealing members 1125a to 1125g are provided in the openings 1121 to 1124 and 1129a to 1129c penetrated by the wiring, and thus the lower chamber is sealed with respect to the upper chamber.

(1) In the electric storage device 1000 of such an embodiment, since the battery module 100, the electrical part and control device 900, and the like are housed in the two-story housing, a projected area in the plan view can be minimized.

(2) As described above, the middle base plate 1120 is fixed to an upper opening of the lower housing 1110 of the housing 1100 via the seal member (sealing member) to form the lower chamber. In addition, the sealing members 1125a to 1125g are provided in the openings 1121 to 1124 and 1129a to 1129c of the middle base plate 1120, which are penetrated by the strong current system wiring and the weak current system wiring, and thus the lower chamber is sealed with respect to the upper chamber. Airtightness of the lower chamber only needs to be in such a degree that the airtightness thereof is maintained against a pressure level of mist atmosphere that is spouted from the cell battery. Since the lower chamber is sealed as described above, there is no possible leakage of the mist from the lower chamber to the upper chamber.

(3) The cooling wind is supplied from the cooling wind introduction port 1110Cin of the lower housing 1110 to the cooling wind introduction ports 110Cin of the three battery blocks 100a to 100c through a duct, which is not shown, from a common fan. The cooling wind that has flown through the cell housing 110 is discharged from the cooling wind discharge port 110Cout of the cell housing to the outside of the electric storage device 1000 through the cooling wind discharge port 1110Cout of the lower housing 1110. The cooling wind introduction port 1110Cin of the lower housing 1110 is connected to the cooling wind introduction port 110Cin of each of the battery blocks 100a to 100c, and also the cooling wind discharge port 1110Cout of the lower housing is connected to the cooling wind discharge port 110Cout of each of the battery blocks 100a to 100c with the sealing member 1126f, which is formed of an elastic body such as rubber and formed in the rectangular annular shape and, being interposed therebetween. Since the cooling wind inlet/outlet of each of the battery blocks 100a to 100c can be connected to the cooling wind inlet/outlet of the lower housing 1110 without using a duct, such connections can contribute to weight reduction and cost reduction.

(4) When the safety valve of each cell battery is opened, the mist is spouted from the inside of the cell. This spouted mist is discharged to each of the battery chambers CRa to CRc and further guided from each of the battery chambers CRa to CRc to a discharge port that is provided in the side walls 1110s of the lower housing 1110 in the electric storage device 1000. Then, the mist is discharged to the outside of the electric storage device 1000 by a drain hose DH that is connected to the mist discharge port.

(5) The operation section of the service disconnect switch 700 is exposed to the upper housing 1130. Thus, even when the electric storage device is sub-assembled, operability thereof is not degraded.

(6) Each battery block requires the pair of voltage signal harnesses 651a and 652a. However, since these harnesses are bundled into one by the harness holder 2100, workability on routing of the harness from the lower chamber to the upper chamber is improved.

(7) The weak current system openings 1129a to 1129c are provided only in the number of the battery blocks 100a to 100c. Thus, an increase in the number of parts to achieve the airtightness can be minimized.

(8) Since the internal power supply cables 613 and 614 for connecting a pair of the battery blocks 100b and 100c to the service disconnect switch 700 is configured to penetrate the one opening 1122. Thus, man-hours and part cost can be reduced.

The invention is not limited to the embodiment that has been described above. Accordingly, the invention can be carried out by being modified as described below.

(1) The invention is not limited to the electric storage device that uses the three battery blocks, but only needs to be the electric storage device that includes the plural battery blocks. The invention can also be applied to the electric storage device in which the battery module is formed of the two battery blocks and to the electric storage device in which the battery module is formed of the four or more battery blocks.

(2) The middle base plate 1120 is provided with the openings 1121 to 1124, which are penetrated by the strong current system wiring, and the openings 1129a to 1129c, which are penetrated by the weak current system wiring. However, the positions and the number of openings are not limited to those in the embodiment. From a perspective of sealing of the lower chamber, the number of openings provided in the middle base plate 1120 needs to be minimized.

(3) The electrical parts, which are mounted on the upper surface of the middle base plate 1120, are also not limited to those in the embodiment. In the embodiment, although the control device 900, which includes the battery controller 300 and the cell controller 200, is provided in the upper chamber, the electrical parts are not limited to those in the embodiment.

(4) The voltage signal harnesses and the temperature signal harnesses are exemplified as the weak current system wiring. However, the weak current system wiring is not limited to those in the embodiment.

(5) The strong current system wiring is described as the flexible power supply cables. However, a metallic conductor may be used for some of the strong current system wiring.

(6) The invention is not limited to the electric storage device that uses the cylindrical cell battery. The invention can also be applied to the electric storage device that uses a square battery or a laminated battery.

(7) An attachment section having a bolt insertion hole may be provided at four corners of each of the battery blocks 100a to 100c. Upper and lower plate materials that constitute the housing 1110 may hold the battery blocks therebetween. Then, the battery block may be fixed to the upper and lower plate materials by bolt.

The invention is not limited to the embodiment and modifications that have been described so far unless otherwise departing from the scope thereof.

The invention claimed is:

1. An electric storage device for vehicle deployment which performs discharge of electric power to an inverter device which controls a motor, and charge of electric power supplied from the inverter device, the electric storage device characterized by comprising:
   a housing that has a lower housing, an upper housing, and a middle base plate mounted between the lower housing and the upper housing, in which a lower chamber is formed below the middle base plate, in which an upper chamber is formed above the middle base plate, and in which the lower chamber is formed in an airtight state with respect to the upper chamber;
   at least two battery blocks that are arranged in the lower chamber and each of which includes plural cell batteries housed in a cell housing;
   a control device that is arranged in the upper chamber and monitors and controls states of the plural cell batteries;
   a junction box that has: a positive electrode external terminal that is connected to positive electrode external power supply wiring for connecting a positive electrode terminal of the battery block of the highest potential of the battery blocks to a positive electrode DC terminal of the inverter device; and a negative electrode external terminal that is connected to a negative electrode external power supply wiring for connecting a negative electrode terminal of the battery block of the lowest potential of the battery blocks to a negative electrode DC terminal of the inverter device;
   positive electrode internal power supply wiring and negative electrode internal power supply wiring, the positive electrode internal power supply wiring penetrating a strong current system opening provided in the middle base plate, being routed from the lower chamber to the upper chamber, and connecting the positive electrode terminal of the battery block of the highest potential to the positive electrode external terminal of the junction box, and the negative electrode internal power supply wiring connecting the negative electrode terminal of the battery block of the lowest potential to the negative electrode external terminal of the junction box within the housing;
   voltage signal wiring that is connected to the positive and negative electrode terminals of the plural cell batteries, penetrates a weak current system opening of the middle base plate, is routed from the lower chamber to the upper chamber, and is connected to the control device within the housing;
   a first sealing member that seals the strong current system opening provided in the middle base plate and tightly closes the lower chamber from the upper chamber; and
   a second sealing member that seals the weak current system opening provided in the middle base plate and tightly closes the lower chamber from the upper chamber.

2. The electric storage device for vehicle deployment according to claim 1 characterized in that
   each of side surfaces of the at least two battery blocks is provided with a board that has a connector for obtaining a voltage signal from each of the plural cell batteries,
   voltage signal wiring is connected to a connector on each board,
   a pair of the voltage signal wiring is held along an edge of the lower housing, and a harness holder for bundling the wiring into one is further provided.

3. The electric storage device for vehicle deployment according to claim 2 characterized in that
   the middle base plate is provided with the plural weak current system openings that are penetrated by the at least two voltage signal wiring, the at least two voltage signal wiring is bundled into one for each of the at least two battery blocks.

4. The electric storage device for vehicle deployment according to claim 2 characterized by further comprising
   a service disconnect switch that is mounted on an upper surface of the middle base plate in the upper chamber and that opening and closing a circuit between the positive electrode terminal of the one battery block of the at least two battery blocks and the negative electrode terminal of the other battery block, in that
   an operation section of the service disconnect switch is exposed from the upper housing.

5. The electric storage device for vehicle deployment according to claim 4 characterized in that
   the middle base plate is provided with one strong current system opening that is penetrated by the positive electrode internal power supply wiring and the negative electrode internal power supply wiring, the positive electrode internal power supply wiring connecting a positive electrode terminal of the one battery block to the service disconnect switch, and the negative electrode internal power supply wiring connecting a negative electrode terminal of the other the battery block to the service disconnect switch.

6. The electric storage device for vehicle deployment according to claim 1 characterized by further comprising
   a service disconnect switch that is mounted on an upper surface of the middle base plate in the upper chamber and that opening and closing a circuit between the positive electrode terminal of the one battery block of the at least two battery blocks and the negative electrode terminal of the other battery block, in that
   an operation section of the service disconnect switch is exposed from the upper housing.

7. The electric storage device for vehicle deployment according to claim 6 characterized in that
   the middle base plate is provided with one strong current system opening that is penetrated by the positive electrode internal power supply wiring and the negative electrode internal power supply wiring, the positive electrode internal power supply wiring connecting a positive electrode terminal of the one battery block to the service disconnect switch, and the negative electrode internal power supply wiring connecting a negative electrode terminal of the other the battery block to the service disconnect switch.

* * * * *